Patented June 28, 1949

2,474,306

UNITED STATES PATENT OFFICE 2,474,306

CELLULOSIC PRODUCTS

Leonard Doub, Detroit, Mich., assignor to Parke, Davis & Company, Detroit, Mich., a corporation of Michigan No Drawing. Application February 23, 1945, Serial No. 579,490

6 Claims. (Cl. 260—212)

This invention relates to new compositions and products derived from partially oxidized cellulose and methods of making the same.

One of the objects of my invention is to prepare new oxidized cellulose compositions which are especially useful in making surgical dressings and which have exceptional lyophilic properties. Another object of the invention is to obtain new germicidal surgical dressings. Still another object is to provide a method for obtaining the new compositions and the surgical dressings made therefrom which have lyophilic and germicidal properties. It is also an object of this invention to provide compositions which have the immediate, prolonged and final properties in contact with body fluids such as blood, serums, exudates and the like, that they continuously exercise actions of great value for surgical dressings.

For many purposes surgical dressings are needed having lyophilic properties and at the same time possessing definite germicidal properties to keep down infections after application of the dressing to wounds, cuts, abrasions, etc. None of the dressings described thus far combine all of these properties and possess the desired degree of action in each of these directions at the same time.

My invention consists in preparing a surgical dressing from oxidized cellulose which is highly lyophilic, i. e. is practically instantaneously wetted by blood, serums and like body fluids, which is germicidal and at the same time possesses the necessary strength to hold together during use. I have found that such surgical dressings may be obtained by the reaction of partially oxidized celluloses with surface active germicides of the high molecular weight quaternary ammonium salt type. Some examples of the surface active agents which I may use are p-t-octylphenoxyethoxyethyldimethylbenzylammonium chloride monohydrate, an alkyldimethylbenzylammonium chloride wherein the alkyl is a mixture of alkyl radicals varying in length from $C_8$ to $C_{18}$ and cetylpyridinium chloride.

I have found that other surface active agents such as wetting agents of the sulphonated bicarboxy acid ester type, sulfated higher fatty alcohol sodium salt and the like do not react with partially oxidized cellulose. Therefore the products resulting from the treatment of partially oxidized celluloses with these wetting agents contain, as expected, only a very small amount of adhering reagent, whereas the product resulting from the treatment of a partially oxidized cellulose with a surface active agent selected from the class consisting of high molecular weight quaternary ammonium salts may contain as high as 20% of the cation corresponding to the quaternary ammonium salt due to an actual ion interchange reaction which I have found takes place between partially oxidized celluloses and wetting agents of this type. In view of the fact that such a reaction occurs it is indeed surprising that the feel, appearance, color and strength of the oxidized celluloses remain unaffected. Still more surprising is the fact that both the high germicidal and surface active properties of the original germicidal wetting agent are maintained in spite of the very marked chemical structural changes which take place in the oxidized cellulose fibers during this ion interchange reaction.

The partially oxidized celluloses employed herein which contain 10 to 23% carboxyl groups are especially useful in body cavities or open wounds since they are completely soluble in or completely absorbed by body fluids while I may use those containing 2 to 10% carboxyl groups for external dressings as they are not soluble in or absorbed by body fluids, but nevertheless they become soft and may even be dissolved or absorbed to a certain degree under these conditions. Likewise, insoluble neutralized oxidized celluloses, wherein some of the free carboxyl groups have been neutralized by alkaline reagents, as described in my copending application Serial No. 593,756, filed May 14, 1945, now abandoned, may also be used in the practice of my invention. These celluloses may be characterized in the same manner as the above oxidized celluloses. I prefer to use the oxidized celluloses prepared by the nitric oxide oxidation method as described by Yackel and Kenyon [J. Am. Chem. Soc., 64, 121 (1942)] and Unruh and Kenyon [J. Am. Chem. Soc., 64, 127 (1942)] for the preparation of these new and useful surgical dressings. However, it should be understood that other fibrous oxidized celluloses may also be employed in the practice of my invention providing they resemble the above preferred nitric oxide oxidized celluloses in both their chemical and physical properties.

The following examples are given for the purpose of illustrating my invention without limiting it in any way to the specific conditions, concentrations and the like which are used:

Example 1

1 gram of cotton partially oxidized by nitric oxide according to the methods referred to above (carboxyl group content 10%) is immersed in 500 ml. of an aqueous 1–1,000 solution of paratertiary - octylphenoxyethoxyethyldimethylbenzylammonium chloride monohydrate for five minutes with agitation. The cotton is removed and allowed to dry. The reaction product which contains 12.4% of said ammonium chloride monohydrate is wet about 10 times faster than the original oxidized cotton and is germicidal.

Example 2

1 gram of oxidized cellulose bandage (10% carboxyl groups) is treated by immersion in 500 ml. of an aqueous 1–1,000 solution of para-tertiary - octylphenoxyethoxyethyldimethylbenzylammonium chloride monohydrate for five minutes with agitation. The bandage is removed and allowed to dry. The resulting bandage is highly lyophilic and is wet in 15–30 seconds or more than 120 times faster than the original bandage which is wet only after one hour under the same conditions. The bandage is also germicidal and contains 15.9% of said ammonium chloride monohydrate.

Example 3

1 gram of oxidized cellulose bandage (15% carboxyl groups) is immersed in 200 ml. of an aqueous, acetone (10%) and alcohol (65%) 1 to 500 solution of para-tertiary-octylphenoxyethoxyethyldimethylbenzylammonium chloride monohydrate for five minutes with agitation. The bandage is removed and allowed to dry. The resulting product contains 4.06% of said ammonium chloride monohydrate and possesses very marked lyophilic and germicidal properties. The bandage prepared in the above manner is wet in 30 to 50 seconds which is about 100 times faster than the wetting time of one hour shown for the original untreated bandage.

Example 4

1 gram of oxidized cellulose bandage (8% carboxyl groups) is treated by immersion for five minutes in 100 ml. of 1% solution of para-tertiary - octylphenoxyethoxyethyldimethylbenzylammonium chloride monohydrate in absolute ethanol. The bandage is removed and allowed to dry. By this process a bandage is obtained which contains about 1% of said ammonium chloride monohydrate and possesses lyophilic properties and germicidal properties comparable to those shown in Example 2.

Example 5

1 gram of oxidized cellulose bandage (13% carboxyl groups) is immersed in 150 ml. of a 3% aqueous solution of para-tertiary-octylphenoxyethoxyethylbenzylammonium chloride monohydrate for five minutes with agitation. The bandage is removed and allowed to dry. The reaction product thus obtained contains 18.4% of said ammonium chloride monohydrate and is wet in two seconds, whereas the original bandage is wet only after one hour under similar conditions. This wetting takes place 1800 times faster than the wetting of the original material.

Example 6

1 gram of partially neutralized oxidized cellulose bandage (15% carboxyl groups before partial neutralization with 0.5 M calcium acetate) is immersed for five minutes with agitation in 500 ml. of a 1–1,000 solution of para-tertiary-octylphenoxyethoxyethyldimethylbenzylammonium chloride monohydrate. The bandage is removed and allowed to dry. The resulting product contains 1.38% of said ammonium chloride monohydrate and is more readily wet than the original neutralized oxidized cellulose.

Example 7

1 gram of oxidized cellulose bandage (18% carboxyl groups) is immersed in 10 ml. of a 1–1,000 aqueous solution of an alkyldimethylbenzylammonium chloride wherein the alkyl is a mixture of alkyl radicals varying in length from $C_8$ to $C_{18}$ for five minutes with agitation. The bandage is removed and dried. The reaction product obtained in this manner is similar in properties to the product as prepared in Example 2.

Example 8

1 gram of oxidized cellulose bandage (16% carboxyl groups) is caused to react with cetylpyridinium chloride by immersing it in 100 ml. of a 1–1,000 aqueous solution of cetylpyridinium chloride for five minutes with agitation. The bandage is removed and allowed to dry. The dressing obtained by this process is highly lyophilic and also germicidal.

The method of assay for the free carboxyl groups in the oxidized celluloses used in the practice of my invention is accomplished by the use of the calcium acetate method as described by Yackel and Kenyon [J. Am. Chem. Soc., 64, 121 (1942)] while the assay method of Auebach [J. Ind. Eng. Chem., Anal. Ed., 15, 492 (1942)] is used for the determination of the quaternary ammonium salt cation in the final reaction products. This method of determining the amount of cation present in these reaction products was selected because it is dependent only on the amount of the cation present and not the amount of the ammonium chloride monohydrate as such. Therefore, in the preceding examples, it should be understood that the so-called "percentage of ammonium chloride monohydrate" is in reality the percentage of the quaternary ammonium salt cation plus a small amount of occluded ammonium salt present in the final products.

I prefer to carry out the aforementioned and described ionic exchange reaction between the various cellulosic products and the germicidal surface active agents in such a manner as to produce a fibrous reaction product containing a small amount of the germicidal surface active agent not in actual chemical combination with the fibers. The total amount of the combined and uncombined germicidal surface active agent in these reaction products should be large enough to insure manifestation of both germicidal and lyophilic properties but on the other hand it should not be so large as to cause irritation or burning of the tissues when these compositions are used as surgical dressings.

I claim:

1. A lyophilic aggregate of independent fibers of a cellulose having a carboxyl content between about 2% and 23% selected from the class consisting of oxidized cellulose and partially neutralized oxidized cellulose, the oxidized cellulose of said fibers being at least partially in the form of its reaction product with a high molecular weight quaternary ammonium salt wetting agent.

2. A lyophilic aggregate of independent fibers of a cellulose having a carboxyl content between about 2% and 23% selected from the class consisting of nitric oxide-oxidized cellulose and partially neutralized nitric oxide-oxidized cellulose, the oxidized cellulose of said fibers being at least partially in the form of its reaction product with a high molecular weight quaternary ammonium salt wetting agent.

3. A lyophilic aggregate of independent fibers of an oxidized cellulose having a carboxyl content between about 2% and 23%, the oxidized cellulose of said fibers being at least partially in the form of its reaction product with a high molecular weight quaternary ammonium salt wetting agent.

4. A lyophilic aggregate of independent fibers of an oxidized cellulose having a carboxyl content between about 2 and 23%, the oxidized cellulose of said fibers being at least partially in the form of its reaction product with para-tertiary - octylphenoxyethoxyethyldimethylbenzyl ammonium chloride monohydrate.

5. A lyophilic aggregate of independent fibers of an oxidized cellulose having a carboxyl content between about 2 and 10%, the oxidized cellulose of said fibers being at least partially in the form of its reaction product with para-tertiary - octylphenoxyethoxyethyldimethylbenzylammonium chloride monohydrate.

6. A lyophilic aggregate of independent fibers of a partially neutralized oxidized cellulose having a carboxyl content between about 2 and 23%, the oxidized cellulose of said fibers being at least partially in the form of its reaction product with para-tertiary-octylphenoxyethoxyethyldimethylbenzylammonium chloride monohydrate.

LEONARD DOUB.

REFERENCES CITED

The following references are of record in the file of this patent:

UNITED STATES PATENTS

| Number    | Name         | Date           |
|-----------|--------------|----------------|
| 2,232,990 | Yackel et al.| Feb. 25, 1941  |
| 2,256,391 | Hiatt        | Sept. 16, 1941 |
| 2,270,326 | Miller et al.| Jan. 20, 1942  |

OTHER REFERENCES

Article by Frantz, in Annals of Surgery, July 1943, pages 116–7, 125–6.

Article by Putnam, in Annals of Surgery, July 1943, pages 127–129.

Article by Seegers et al., in Proc. Soc. Exptl. Biol. and Med., May, 1944, pages 72–3.

International Abstract of Surgery, July 1944, page 73.